June 2, 1970          J. M. BENSON          3,514,998

D.C. CIRCUIT FOR OPERATING ASYMMETRIC THERMOPILE

Filed July 22, 1968

INVENTOR
JAMES M. BENSON

BY
*Cushman Darby & Cushman*
ATTORNEYS

United States Patent Office 3,514,998
Patented June 2, 1970

---

3,514,998
D.C. CIRCUIT FOR OPERATING ASYMMETRIC THERMOPILE
James M. Benson, Hampton, Va., assignor to Teledyne Inc., Los Angeles, Calif., a corporation of Delaware
Filed July 22, 1968, Ser. No. 746,543
Int. Cl. G01p 5/10; G01l 21/14
U.S. Cl. 73—204                                    9 Claims

---

ABSTRACT OF THE DISCLOSURE

A D.C. circuit, including a reversing switch, for operating a thermopile device and including a variable resistor coupled across the thermopile so as to form a bridge circuit therewith wherein the bridge circuit is balanced by adjustment of the resistor for each of two positions of the reversing switch. When the bridge is balanced a galvanometer coupled between the variable resistor and the thermopile will indicate only the desired thermoelectric signal from the thermopile and will not reflect any asymmetric characteristics which may be present in the thermopile.

---

Background of the invention

The present invention relates to D.C. energized thermopiles and more particularly to a D.C. circuit for heating such thermopiles wherein the circuit includes a reversing switch to compensate for the effects of asymmetry that may be present in the thermopile.

Single and multiple thermocouple devices are commonly used for measuring quantities such as air velocity, pressure in a vacuum system and a composition of gases, wherein the operation of the electrically heated devices depends upon the rate of cooling thereof when exposed to the medium wherein the measurement is to be made. Patents Nos. 2,540,822; 2,652,723; and 2,745,283 to Hastings describe devices of this type and electrical circuits with which they may be operated from an alternating current source.

In many cases it is desirable to use a D.C. power source instead of an alternating current source to energize the thermocouple or thermopile. In the use of a D.C. power source, however, the effects of asymmetry of the thermocouple or thermopile become very important, although it is of little practical importance when the thermocouples are used with A.C. heating power; and experience has shown that in the manufacture of practical sensors with an array of thermocouples it is uneconomical and very nearly impossible to fabricate the array with precise symmetry. Thus, those concerned with the development of circuits for operating thermopiles with direct current have long recognized the need for a means to compensate for the effects of asymmetry of the sensor thermopile. The present invention fulfills this need.

Summary of the invention

The general purpose of this invention is to provide a circuit for operating thermopiles with direct current which embraces all the advantages employed in prior art circuits and possesses the additional advantage of compensating for the effects of asymmetry of the thermopile. To attain this the present invention contemplates a unique switch arrangement in the D.C. supply circuit for the thermopile whereby a bridge formed by the thermopile and a resistor connected thereacross is balanced so that the reading on a galvanometer coupled between the thermopile and the resistor is governed only by the thermoelectric voltage generated in the thermopile and not by the D.C. heating voltage.

An object of the present invention is the provision of a D.C. circuit for operating a thermopile wherein the circuit includes a reversing switch to compensate for asymmetry of the thermopile.

Other objects and features of the invention will become apparent to those of ordinary skill in the art as the disclosure is made in the following description of a preferred embodiment of the invention as illustrated in the accompanying drawings.

Description of the preferred embodiment

A thermopile may be made up of alternate lengths of thermocouple material forming two or more thermocouple sections, joined end-to-end to obtain a continuous wire. Alternate junctions of the thermopile are suitably mounted in relatively massive support members of high heat conductivity, such as copper studs, which provide sufficient heat conductivity away from the junction so mounted to keep them at ambient temperature. Accordingly, on heating the thermopile, as by the passage of direct current therethrough, the junctions mounted in copper studs remain at substantially ambient temperature and become cold junctions, while the alternate junctions not so mounted are heated by the current and become hot junctions. In this manner a direct current voltage is generated by the thermopile, which is proportional to the temperature difference between alternate junctions.

The thermopile so described may be disposed in a moving fluid stream, which will exert a cooling effect on the hot junctions of the thermopile and in this manner reduce the temperature difference between alternate junctions. A galvanometer may be employed to measure the voltage generated by the thermopile, the magnitude of which will be inversely indicative of the cooling effect of the fluid stream, and thereby of the fluid stream velocity.

The heated thermopile may thus be variously employed to measure the velocity of moving fluid streams, and is sensitive and accurate over a wide range of velocities. A device may be employed, for example, to measure air movement of the order of a few feet per minute, such as may be encountered in the convection current of a heating unit, and may be employed with equal utility to measure fluid velocity in ducts, as a meteorological instrument, and as an air-speed indicator in helicopters, propeller-driven and jet aircraft.

Figure 1:
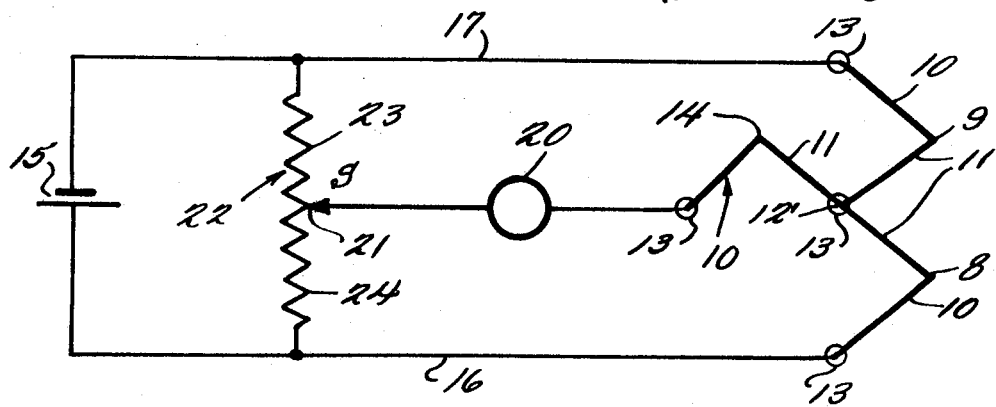
FIG. 1 shows a schematic circuit diagram of a thermopile, which includes a compensating thermopile, and the D.C. heating and measuring circuits employed therewith.

In FIG. 1 there is shown a schematic representation of a thermopile constructed of alternate sections of thermocouple materials 10 and 11, the alternate sections being butt welded or similarly joined end-to-end into junctions 8 and 9. Alternate junctions 12′ are suitably mounted in relatively massive heat conducting support members, such as copper studs 13, the studs serving not only to effect cold junctions, but also to support the relatively fragile thermopile. Junctions 12′ may be exposed directly to the same medium as 8 and 9, in preferred embodiments of this invention. This is especially important if the compensating couple 14 is omitted from the assembly. If the compensating thermocouple 14 is included as disclosed in Hastings U.S. Pat. No. 2,745,283 the junctions at 13 may all be removed from direct exposure to the medium but the requirement remains that all junctions at 13 be in good thermal contact with a common heat sink so that they are all at essentially the same temperature, even though said temperature may differ somewhat from that of the medium. Obviously, the thermopile may be attached to the studs in several ways, such as by insertion into slots, by means of clips, welding or the like. The studs 13 are suitably spaced and supported by an insulating block (not shown).

The thermopile illustrated in FIG. 1 comprises two complete thermocouples, whereby the thermopile will generate a voltage equal to the summation of voltages induced by the individual thermocouples. For the purposes of the invention, the thermopile may comprise any desired number of thermocoupled sections, depending primarily upon the voltage required for measurement or similar purpose. Additionally, to compensate for error due to ambient temperature changes a thermopile 14 may be provided in the manner described in Pat. No. 2,745,283 to Hastings.

In the prior art circuits for operating such thermopiles by the use of direct current, a D.C. heating source or battery 15 is connected directly to the sensor at the end studs 13. As shown, the heating current is conducted to the end stubs 13, and therethrough to the ends of the thermopile through a heating circuit comprising conductors 16 and 17. A suitable voltage responsive device such as galvanometer 20, preferably a millivoltmeter, is connected to the compensating thermocouple 14 through the associated stud 13. The opposite side of the galvanometer 20 is connected to a movable tap 21 which is adjustable along the resistor 22.

By means of the heating circuit, power is fed through the thermopile, and the thermopile is accordingly heated. The heat generated in the alternate junction 12′ will be dissipated in the common sink so that they remain substantially at the ambient temperature. Alternate junctions 8 and 9, however, will be heated and a direct current voltage will be generated by the thermopile by reason of the temperature difference between the alternate junctions thereof.

If the heated thermopile is disposed in a moving fluid stream, it is evident that hot junctions 8 and 9 will be cooled by the fluid passing thereover, and the temperature difference between the hot and cold junctions of the thermopile will be correspondingly reduced. The resultant reduction is induced thermovoltage of the thermopole will be prooprtional to the velocity of the fluid stream, so that by proper calibration the galvantometer 20 may directly indicate the velocity of the fluid surrounding the thermopile.

However, in using the prior art device of FIG. 1, the effects of asymmetry of the sensor thermopile become very important. If the resistances of thermocouples 8 and 9 were exactly the same and the resistances of the sections 23 and 24 of the resistor 22 on either side of the tap 21 were equal, the resulting bridge would be balanced and no EMF from the battery 15 would appear across the galvanometer 20. In this ideal condition, the only EMF affecting the galvanometer would be the thermoelectric EMF generated by the thermocouples 8 and 9 and the sensor would accurately indicate the sensed variable, e.g., fluid velocity.

Experience, however, has shown that in the manufacture of practical thermopile sensors with an array of thermocouples, such as shown in FIG. 1, it is uneconomical and almost impossible to fabricate the array with precise symmetry. Thus, the resistances of thermocouples 8 and 9 will most likely be unequal resulting in an asymmetric thermopile. Under this condition, the bridge could be balanced by adjusting the values of resistances 23 and 24 until no EMF from the battery 15 affects the galvanometer 20 and only the desired thermoelectric EMF would affect the galvanometer.

Unfortunately, this balance point cannot be readily determined in practical usage by adjustment of the slidable contact 21 in the circuit shown in FIG. 1. The reason for this is that the thermocouples 8 and 9, when in use in the normal environment of the device, are continually being subjected to the passage of the fluid so that a thermoelectric voltage is always being generated in the thermocouples 8 and 9. It can be seen that under these conditions it is impossible for the galvaneometer 20 to be adjusted to its "zero" reading. Thus, movement of the tap 21 would only have the effect of changing the reading provided by the galvanometer 20 without indicating to the operator that point at which the bridge is balanced.

Figure 2:
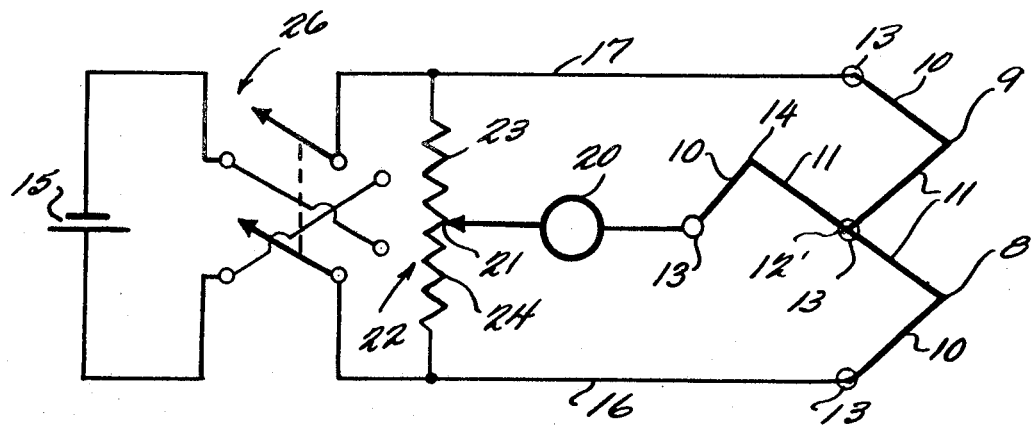
FIG. 2 illustrates a schematic circuit diagram of the thermopiles of FIG. 1 and the D.C. energizing circuit of this invention.

In FIG. 2 there is shown a unique circuit arrangement wherein a double pole, double throw reversing switch is added to the circuit of FIG. 1 between the battery 15 and the resistor 22. This reversing switch 26 is arranged to reverse the polarity of the heating voltage applied to the bridge and to the thermocouples 8 and 9 which form a part of that bridge. Utilizing this circuit, if the bridge is slightly out of balance and if the thermocouples 8 and 9 produce no thermoelectric voltage it is a simple matter to balance the bridge by adjusting the position of the movable contact 21 in the same manner as the bridge is balanced utilizing the prior art circuit of FIG. 1. However, when there are thermoelectric EMF's being thermocouples 8 and 9, the bridge may not be balanced by adjusting the contact 21 to produce the zero reading of the galvanometer for the reason previously stated. Utilizing the unique circuit of FIG. 2, however, the bridge may be balanced by closing the switch 26 to a first position and observing the reading of galvanometer 20. When the bridge is balanced there will be a reading of the galvanometer 20 that represents only the thermoelectric EMF generated by the thermocouples 8 and 9. At this "null" point, the reversing switch 26 may be moved to its second closed position so as to apply the same heating voltage to the thermocouples 8 and 9 with reversed polarity, and the new reading of the galvanometer 20 will be the same as when the switch 26 was in its first closed position. If the reading of the galvanometer 20 is different, e.g. greater in the first position of switch 26 than in the second position thereof, the contact 21 may be adjusted so as to make the galvanometer 20 read the same for whichever position of the reversing switch is used.

Thus, the circuit of this invention when operated in the manner described allows the bridge circuit to be adjusted precisely so that it balances even though the various thermocouples differ considerably in symmetry and even though various sensors or thermopiles may be connected to the circuit. In addition, the circuit of this invention provides for the balancing of the bridge circuit by the operator even while the associated thermopiles are generating thermoelectric EMF's as would be the case under normal operating conditions.

Obviously many modifications and variations of the present invention are possible in view of the above teachings. It is therefore to be understood that the invention may be practiced otherwise as specifically described.

What is claimed is:

1. A heat transfer measuring device comprising:
   a main thermopile having at least two thermocouple sections;
   each section of said thermopile having junctions of a first class which have low and substantially identical thermal inertia;
   each section of said thermopile having alternate junctions of a section class which have high and substantially identical thermal inertia so as to remain at ambient temperature;
   means mounting said thermopile so that all of said first class junctions are similarly exposed solely to a surrounding fluid medium, wherein the heat transfer between said medium and said first class junction is to be measured;
   said mounting means mounting said thermopile so that all of said second class junctions are similarly exposed to said medium;

voltage responsive means in circuit with said thermopile;

impedance means in circuit across said thermopile and in adjustable circuit relationship with said voltage responsive means;

a D.C. power source; and switching means in selective circuit relationship between said power source and said impedance means for selectively reversing the polarity of the voltage from said power source as applied to said thermopile whereby an identical reading is obtained on said voltage responsive means upon adjustment of said impedance means for each voltage polarity as applied to said thermopile.

2. The heat transfer device of claim 1 further including:

at least one compensating thermocouple section coupled between said main thermocouple and said voltage responsive means;

said one or more compensating thermocouple sections having first class and second class junctions with low and high thermal inertias, respectively;

wherein the thermal inertias of all of said first class junctions are substantially identical; and wherein the thermal inertias of all of said second class junctions are substantially identical.

3. The heat transfer device of claim 2 wherein said voltage responsive means is a galvanometer.

4. The heat transfer device of claim 2 wherein said impedance means includes at least one resistor.

5. The heat transfer device of claim 2 wherein said switching means includes a double pole, double throw reversing switch.

6. A circuit for operating a heat transfer measuring device wherein said device includes at least two thermocouple sections, said circuit comprising:

voltage responsive means for coupling in circuit with said device and with said thermocouple sections;

impedance means in adjustable circuit relationship with said voltage responsive means;

a D.C. power source; and switching means in selective circuit relationship between said power source and said impedance means for selectively reversing the polarity of the voltage from said power source as applied to said device whereby an identical reading can be obtained on said voltage responsive means upon adjustment of said impedance means for each voltage polarity as applied to said device.

7. The circuit of claim 6 wherein said voltage responsive means is a galvanometer.

8. The circuit of claim 6 wherein said impedance means includes at least one resistor.

9. The circuit of claim 6 wherein said switching means includes a double pole, double throw reversing switch.

References Cited

UNITED STATES PATENTS

| | | | |
|---|---|---|---|
| 2,540,822 | 2/1951 | Hastings | 73—204 |
| 2,652,723 | 9/1953 | Hastings | 73—204 |
| 2,745,283 | 5/1956 | Hastings | 73—204 |

S. CLEMENT SWISHER, Primary Examiner

D. E. CORR, Assistant Examiner

U.S. Cl. X.R.

73—359, 361, 399